United States Patent [19]

Kumasaka et al.

[11] Patent Number: 4,774,616
[45] Date of Patent: Sep. 27, 1988

[54] MAGNETIC HEAD HAVING AN INTEGRATED RECORDING AND PLAYBACK HEAD AND AN ERASURE HEAD

[75] Inventors: Noriyuki Kumasaka, Ome; Hideo Fujiwara, Tokorozawa; Shigekazu Otomo, Sayama; Takeo Yamashita; Noritoshi Saito, both of Hachioji; Mitsuhiro Kudo, Nishitama, all of Japan

[73] Assignee: Hitachi, Ltd., Tokyo, Japan

[21] Appl. No.: 694,386

[22] PCT Filed: Apr. 2, 1984

[86] PCT No.: PCT/JP84/00159
§ 371 Date: Dec. 4, 1984
§ 102(e) Date: Dec. 4, 1984

[87] PCT Pub. No.: WO84/03984
PCT Pub. Date: Oct. 11, 1984

[30] Foreign Application Priority Data
Apr. 4, 1983 [JP] Japan .................. 58-57816

[51] Int. Cl.⁴ .................... G11B 5/16; G11B 5/22
[52] U.S. Cl. .................... 360/118; 360/110; 360/126; 360/122
[58] Field of Search ............. 360/118, 119, 121, 122, 360/126, 110; 29/603

[56] References Cited

U.S. PATENT DOCUMENTS

| | | | |
|---|---|---|---|
| 4,423,550 | 1/1984 | Fujioka et al. | 360/118 |
| 4,425,701 | 1/1984 | Takahasi et al. | 360/121 |
| 4,559,572 | 12/1985 | Kumasaka et al. | 360/110 X |
| 4,608,293 | 8/1986 | Wada et al. | 360/125 |
| 4,642,719 | 2/1987 | Morita et al. | 360/121 |

FOREIGN PATENT DOCUMENTS

| | | | |
|---|---|---|---|
| 55-42302 | 3/1980 | Japan | 360/119 |
| 56-169214 | 12/1981 | Japan | 360/118 |
| 57-44219 | 3/1982 | Japan | 360/118 |
| 57-179925 | 11/1982 | Japan | 360/118 |
| 58-155513 | 9/1983 | Japan | 360/118 |
| 59-8120 | 1/1984 | Japan | 360/118 |
| 59-54024 | 3/1984 | Japan | 360/110 |
| 8403984 | 10/1984 | PCT Int'l Appl. | 360/121 |

Primary Examiner—Stuart N. Hecker
Assistant Examiner—Alfonso Garcia
Attorney, Agent, or Firm—Antonelli, Terry & Wands

[57] ABSTRACT

The present invention relates to a magnetic head, which can form guard bands on a magnetic recording medium and which is especially suitable for magnetic discs, and a fabrication process thereof. The magnetic core of the present invention includes a recording and reproduction head core (31) and an erasure head core (32) which is integrally joined in series to the head core (31) for forming guard bands. Magnetic circuits are constructed of metallic magnetic materials (34), (34'), (35) and (35') formed on non-magnetic members (33) and (33'). As a result, a recording medium having high coercive forces can be recorded while the track width is reduced and the fabrication is facilitated with a high accuracy.

4 Claims, 6 Drawing Sheets

MAGNETIC HEAD HAVING AN INTEGRATED RECORDING AND PLAYBACK HEAD AND AN ERASURE HEAD

BACKGROUND AND SUMMARY OF THE INVENTION

The present invention relates to a magnetic head, for forming guard bands on a magnetic recording medium, and a process of fabrication thereof and, more particularly, to a magnetic head suitable for use in a recording and reproduction device for magnetic discs.

In a magnetic disc device for forming recording tracks in the circumferential direction around a disc-shaped recording medium, crosstalk between adjacent tracks becomes a problem during reproduction if the spacing of the tracks is reduced to increase the recording density.

Figure 1:
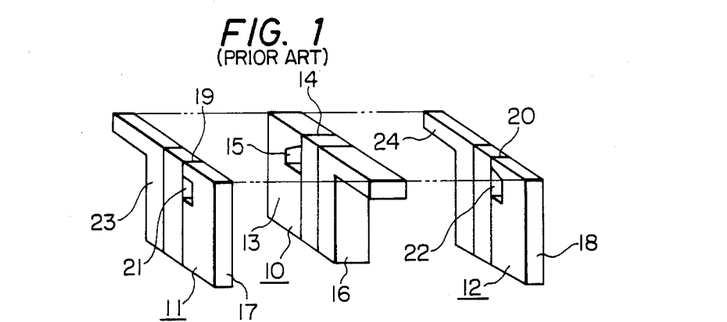
FIGS. 1 and 2 are a perspective view and a top plan view, respectively, of a magnetic head according to the prior art.
Figure 2:
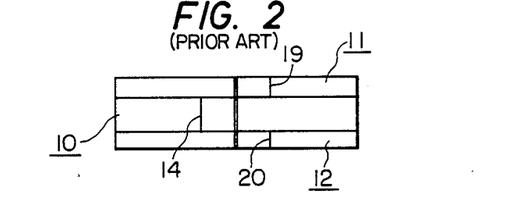

For this purpose, the recording and reproduction magnetic head used in the prior art has a structure such as that shown in FIGS. 1 and 2. This magnetic head is constructed of three head cores 10, 11 and 12. The first head core 10 is formed so that it has a functional gap 14 and a coil-winding aperture 15, and is constructed of a magnetic core portion 13 made of ferrite and an L-shaped member 16 made of a non-magnetic material such as ceramic. Similarly, the second and third head cores 11 and 12 are constructed of magnetic core portions 17 and 18 of ferrite and L-shaped non-magnetic members 23 and 24, respectively, and are formed so as to have functional gaps 19 and 20 and coil-winding apertures 21 and 22, respectively. The head cores 10, 11 and 12 are cut to predetermined widths out of the same block and are joined together to form a monolithic structure, as shown in FIG. 2. The central head core 10 is used for recording and reproduction, whereas the head cores 11 and 12 at either side thereof are used for erasure.

Because of this construction, the pair of erasure gaps 19 and 20 scan only the side portions of the recording track formed by the recording and reproduction gap 14 on the surface of the recording medium adjacent to the magnetic head of FIG. 2. As a result, the two sides of the recording track act as guard bands which are substantially completely signalless, so that little crosstalk is generated from adjacent tracks during the reproduction, even if the track spacing is narrowed.

In the magnetic head of this construction, however, the head cores 10, 11 and 12 have to be connected together after being cut from the block. During this process, the alignment of each of the gaps 14, 19 and 20 in particular is an extremely difficult job. If the track width is 30 $\mu$m or less, moreover, the mechanical strength of the head cores is reduced so that they are difficult to machine.

Recently in order to reduce the recording wavelengths used, a recording medium utilizing high coercive forces has been employed. As a result, conventional magnetic heads made of a ferrite material are not capable of adequately recording on such a recording medium. Magnetic materials with high saturation magnetic flux densities and high permeabilities are limited to metallic magnetic materials. As known in the art, however, the metallic magnetic materials in bulk have the disadvantage that they cannot provide satisfactory characteristics in the high-frequency range because of eddy-current losses. In order to avoid this disadvantage, a magnetic head has been proposed which employs multi-layered metallic magnetic films prepared by thin-film formation techniques. It is, however, extremely difficult to realize the magnetic head of the structure of FIGS. 1 and 2 by this method.

Japanese Patent Laid-Open No. 57-44219 a magnetic head in which a head element portion, having a recording and reproduction gap, and a head element portion, having a pair of erasure gaps are joined together such that they are arranged to have their individual gaps in parallel with each other and such that they are perpendicular to the gap direction. However, the magnetic head thus disclosed does not use a thin film of metallic magnetic materials so that it cannot obtain the advantage which could be obtained by making the magnetic materials thin.

The present invention is designed to solve these various problems, and provides both a magnetic head which has a recording and reproduction gap and a pair of erasure gaps, and which is remarkably easy to fabricate and is very accurate, and also a process of fabricating such a head. The present invention is also designed to provide both a magnetic head which is so constructed that it can record on a recording medium which utilizes high coercive forces, and can easily form track widths of 20 $\mu$m or less, and a process of fabricating such head.

In order to achieve these objects, a magnetic head according to the present invention is of an integrated structure comprising a recording and reproduction head provided with a first core which has a magnetic circuit constructed of magnetic materials formed on a non-magnetic member, and an erasure head provided with second and third cores which have magnetic circuits constructed of magnetic materials formed on another non-magnetic member and which are arranged to erase both side portions of a track width of a magnetically-recorded portion formed on a magnetic recording medium by the recording and reproduction head, by the use of the second and third cores, to leave a desired recording track width, wherein the recording and reproduction head and the erasure head are connected together in the direction in which the magnetic recording medium runs, to provide the integrated structure.

More specifically, the recording and reproduction head is constructed such that ridges of a pair of metallic magnetic films of a generally V-shaped cross-sectional shape which form a magnetic circuit abut against each other from either side of a non-magnetic gap material to form the first core, V-shaped cross-sectional portions thereof are exposed on the surface of the first core facing the magnetic recording medium, flat surfaces are provided on leading edges of the ridges of the pair of metallic magnetic films so as to extend parallel to each other and perpendicular to the direction in which the magnetic recording medium runs, the width of the flat surfaces which is defined by the intersections between those flat surfaces and the surface facing the magnetic recording medium corresponds to the track width, and the metallic magnetic films are formed on the non-magnetic member in which are formed ridges shaped to correspond to the V-shape. The erasure head is constructed such that pairs of V-shaped metallic magnetic films forming magnetic circuits are formed on both surfaces of two non-magnetic members of a V-shaped section so that leading edges of ridges thereof are flat, and the pairs of V-shaped metallic magnetic films are made to abut against each other on either side of a non-magnetic gap material at portions thereof adjacent to the flat surfaces of the leading edges of the magnetic members to form the second and third cores, sections of the metallic magnetic films on both side of the V-shaped portions are exposed on the surface of the second and third cores facing the magnetic recording medium, the abutting portions of each of these pairs of metallic magnetic films extend parallel to each other and generally perpendicular to the direction in which the magnetic recording medium runs, and the width of the flat surfaces which form the leading edges of the non-magnetic members sandwiched between the second and third cores is defined by the intersections between those flat surfaces and surface of the second and third cores facing the magnetic recording medium and is equal to or less than the track width. A typical magnetic head of the present invention can be fabricated by connecting together the recording and reproduction head and the erasure head thus prepared in series in the direction in which the magnetic recording medium runs, to form a monolithic structure, and by equipping this integrated structure with a coil.

The magnetic head of the present invention can be easily fabricated by a process comprising a step (i) of forming at least one coil-winding groove in a side surface of each of two non-magnetic blocks which will form a gap, a step (ii) of forming parallel grooves in the gap-forming side surface of the non-magnetic blocks at right angles to the coil-winding grooves in such a manner that a plurality of ridges are left, a step (iii) of coating at least the grooves of the gap-forming side surface of the non-magnetic blocks with a metallic material after step (ii), a step (iv) of filling the grooves whose surfaces have been coated with the metallic magnetic material with a non-magnetic material, a step (v) of removing unwanted portions of the non-magnetic filler and magnetic material of one of the non-magnetic blocks to expose the gap-forming side surface so that a desired track width is provided, a step (iv) of removing unwanted portions of the non-magnetic filler and magnetic material of the other of the non-magnetic blocks after step (iii) to expose the gap-forming side surface which is provided with both a desired non-magnetic portion and a pair of metallic magnetic members at either side thereof, a step (vii) of cutting the blocks after steps (v) and (vi) at central portions thereof into pairs of core blocks, a step (viii) of forming a non-magnetic layer of a desired thickness on the gap-forming side surface of at least one of the pairs of blocks after step (vii), a step (ix) of connecting in a face-to-face relationship the gap-forming side surfaces of the pairs of blocks after step (viii), a step (x) of connecting together two sets of connected blocks at a predetermined position to form a monolithic structure, and a step (xi) of cutting the thus-connected blocks at a predetermined position to fabricate at least one magnetic head core.

In the present invention, as described above, the first core is constructed by butt-jointing generally V-shaped metallic magnetic members which are formed on the ridges of adjacent non-magnetic protective members, through a non-magnetic gap member. The track width can be regulated by the leading edges of the V-shaped metallic magnetic films to a desired width by polishing the adjacent faces thereof. In this case, a suitable selection can be made within a range such that the ridges of the non-magnetic protective member do not appear. Thus, the first head core provides a recording and reproduction magnetic head.

Next, the second and third head cores are prepared by a method similar to that of the first head core, and are separated into the second and third cores by polishing their gap-forming surfaces during the polishing step until the ridges of the non-magnetic protective members appear. The desired recording track width can be regulated by making the width by which the ridges of the non-magnetic protective members are exposed equal to or less than the track width of the first head core. Specifically, the erasure magnetic head of the second and third cores is formed on either side of the exposed portions of the non-magnetic protective members, so that only the two sides of the recording track recorded by the first head core are scanned by a pair of erasure heads. As a result, both sides of the recording track are provided with guard bands which are substantially completely signalless. The thickness of the coating of the metallic magnetic films is substantially equal to the width of the guard bands, so that the guard band width can be selected as required by changing the thickness of the metallic magnetic films. As a result, the guard bands can be made narrower than those of the prior art of FIGS. 1 and 2.

The first recording and playback head core and the second and third erasure magnetic heads of the above construction are connected in series to form a monolithic structure which provides a single magnetic head.

Thus, according to the present invention, the track width can be regulated as required by changing the thickness of the metallic magnetic films so that it can be easily made less than that of the magnetic head made of a bulk material in accordance with the prior art, and can find a suitable application as a magnetic head for high-density recording. It is also easy to reduce the guard band width.

The metallic magnetic material used in the first core in the present invention can easily be made the same as or different from that of the second and third cores.

In the magnetic head structure of the present invention, it is recommended that a non-magnetic protective material is applied after the coating with the metallic magnetic films, to protect the metallic magnetic films in the vicinity of the gap. The protective material may be filled in with glass or a wear-resistant material such as $Al_2O_3$ or $SiO_2$ may be formed over it, or it may have a structure consisting of two or more layers of this wear-resistant protective material and glass. In this case, the glass can be used as a connecting material for joining together the two core halves.

The metallic magnetic films of the magnetic head core of the present invention may be made of any highly permeable material, so long as it has a higher saturation magnetic flux density Bs than that of the conventional ferrite and a magnetic distortion in the vicinity of zero, and may be either a polycrystalline metallic magnetic material, which is represented by the Fe—Al—Si alloys (or the so-called "Sendust alloys"), or the Ni—Fe alloys (or the so-called "Permalloy alloys"), or an amorphous magnetic alloy material. These magnetic materials are coated by a thin-film formation technique such as sputtering or vacuum evaporation. The non-magnetic material is provided to protect the magnetic films and is made of a material with an excellent wear-resistance, such as non-magnetic ferrite, ceramic or glass.

Moreover, the above metallic magnetic films can have a multi-layered construction, in which the magnetic films and the non-magnetic films are alternately laminated, as is well known in the art.

As has been described above, the magnetic head of the present invention can provide the following advantages. Since the magnetic core can be made of a magnetic material which has a high saturation magnetic flux density, a recording medium requiring high coercive forces can be recorded on adequately with a high density, and a narrow track head of any track width can be easily fabricated. Since the erasure widths can be changed as required for the recording track by controlling the thickness of the magnetic films of the erasure head, moreover, the recording density across the widthwise direction of the track can be increased. Since the pair of erasure heads are integrated, it is easy to fabricate a magnetic head which has a very precise effective recording track width. Since the recording and reproduction head and the erasure heads are easily integrated, furthermore, the magnetic head of the present invention can be mass-produced very easily.

Incidentally, details of the recording and playback head portion of the magnetic head of the present invention are disclosed in the specification entitled "Magnetic Head and Process of Fabrication Thereof", which was filed as a Japanese patent application No. 58-16067 on Feb. 4, 1983. The invention disclosed by the Japanese patent application No. 58-16067 is a copending application preceding the present invention but does not raises the prior art. Moreover, the Japanese patent application No. 58-16067 was also filed, claiming the convention priority, in the United States of America, Canada and Korea and before the European Patent Office (while designating England, West Germany, France and Netherlands).

The remaining portions of the magnetic head and its fabrication process according to the present invention, which are not described in the present specification, are within the technical knowledge in the prior art.

DETAILED DESCRIPTION OF THE DISCLOSED EMBODIMENTS

The construction of the magnetic head and its fabrication process according to the present invention will now be described in detail in connection with embodiments thereof.

Figure 3:
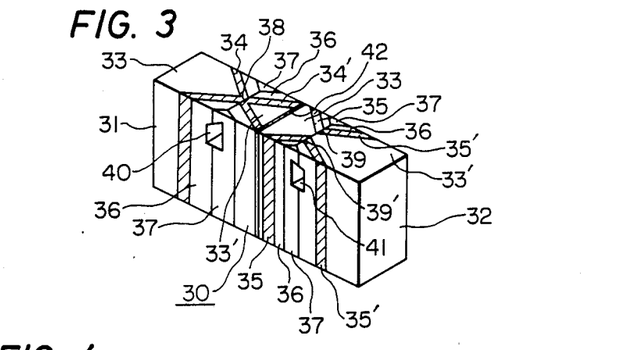
FIGS. 3 and 4 are a perspective view and a top plan view, respectively, of the magnetic head according to one embodiment of the present invention.
Figure 4:
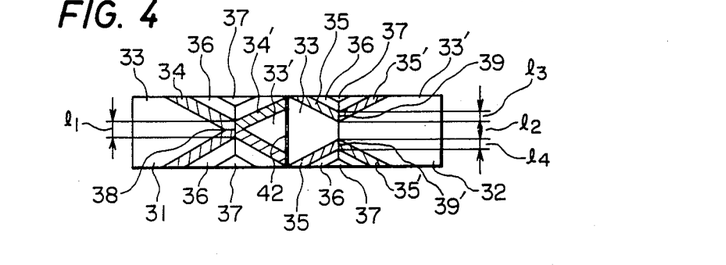

FIGS. 3 and 4 are a perspective view and a top plan view of the construction of the magnetic head according to one embodiment of the present invention.

Reference numeral 30 indicates a magnetic head which is constructed of a first head core 31 for recording and reproduction and a second-and-third head core 32 for erasure, connected in series to the first head core 31. Numerals 33 and 33' indicate non-magnetic protective members for the respective head cores, which are made of a bulk material such as ceramic, non-magnetic ferrite, or glass and which are formed to have ridges at facing portions of each of core halves. Both sides of these ridges are coated with crystalline or amorphous alloy layers 34, 34' and 35, 35', respectively, of Fe—Al—Si or Ni—Fe, which are made of metallic magnetic materials of a high saturation magnetic flux density. Each of these coatings has a composition with virtually zero magnetostriction. The portions where the pairs of metallic magnetic materials 34 and 34', 35 and 35' abut are polished to form track portions and operating gaps, and thereby provide a desired track width $l_1$ (which is exemplified by 30 $\mu$m for the first core 33). In the erasure head core 32, the non-magnetic protective members 33 and 33' are polished until they are exposed, after they have been coated with the magnetic films, so that the exposed width $l_2$ thereof forms a recording track width such that $l_1 \geqq l_2$. This polishing separates the pair of erasure head cores to form a structure such that both edge portions of a track which is recorded so as to have a width of exactly $l_1$ are erased to leave the desired recording track width. Widths $l_3$ and $l_4$ of the erasure heads correspond to the thicknesses of the magnetic films thereof, and have a value of about 15 $\mu$m if they are made simultaneously with the first head core. As a result, the guard band width can be selected as desired in order to increase the recording density in the track-width direction, if the thicknesses of the coatings are made small.

Incidentally, since the vicinity of the gap is restricted so as to provide a narrow track, the metallic magnetic films can be coated with a protective material 36, for example they can be coated with about 10 $\mu$m of $Al_2O_3$, and molten glass 37 is then poured thereinto to fill any spaces left. The glass acts as a connecting material for joining together the two core halves by a non-magnetic gap material. Reference numeral 38 indicates an operating gap for recording and playback, and numerals 39 and 39' indicate operating gaps for erasure. Numerals 40 and 41 indicate coil-winding apertures for the corresponding cores. The first head core 31 for recording and reproduction and the second-and-third head core 32 for erasure are connected together in series to fabricate a magnetic head for magnetic discs.

The magnetic head thus fabricated according to the present invention has the following advantages over the ferrite bulk head of the prior art:

(1) A head of any narrow track width can be easily obtained.

(2) The magnetic head is suitable for use with a recording medium which requires a high coercive force (HC), and the magnetic head can be made very dense because it can use a material of a high saturation magnetic flux density (Bs).

(3) The erasure widths of the recording track can be changed as required, and the recording density in the track-width direction can be increased by controlling the thickness of the magnetic films.

(4) Since the pair of erasure heads are integrated, the effective recording track width can be formed very accurately and easily.

(5) Mass-productivity is increased because the recording and reproduction head core and the erasure heads can be easily integrated.

One example of the process of fabricating the magnetic head according to the present invention will be described in the following.

Each of the steps of the fabrication process of the present invention are illustrated in FIGS. 5(a) to (i). In the following, the steps corresponding to FIGS. 5(a), 5(b) and so on are called step (a), step (b), etc.

Figure 5A:
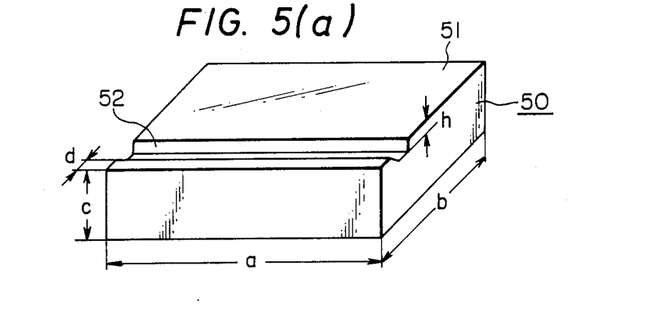
FIGS. 5(a) to (i) are views of the individual steps of the process of fabricating the magnetic head according to this embodiment of the present invention.

(i) As shown in FIG. 5(a), blocks 50 made of non-magnetic Zn—ferrite are prepared. One of the blocks will provide the recording and reproduction magnetic head, and the other will provide the erasure magnetic heads. The heads are worked by similar fabrication processes in this specification, the steps for one block are described, and the steps relating to the other block are described within intermediate steps.

The dimensions of the non-magnetic block 50 are: a=15 mm, b=6 mm, and c=1.2 mm. A plurality of head cores are cut from the block in the core-thickness direction a. A pair of core blocks are cut so as to have a core height b of 2.5 mm, and c indicates one half of the total core width of the pair of cores. Numeral 51 indicates a gap abutment surface in which a groove 52 is formed parallel to the ac plane to provide coil-winding apertures, leaving a gap depth d. The depth h of the coil-winding groove 52 is 0.35 mm.

Figure 5B:
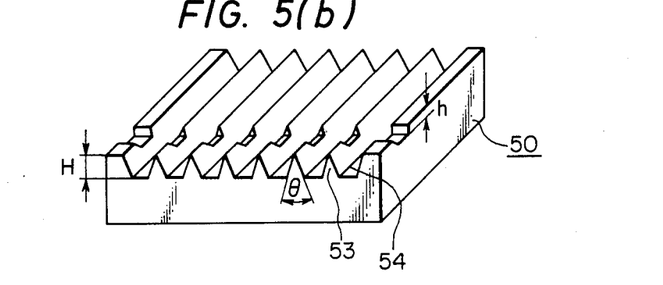

(ii) In step (b), grooves 54 defining a plurality of parallel ridges 53 at identical spacing are formed with a high-speed dicing saw at light angles to the coil-winding groove formed in the preceding step (a). The depth H of the grooves 54 is larger than the depth h of the coil-winding groove 52. Here, H=0.6 mm. The angle $\theta$ of the ridges should be as acute as possible, but if they are machined, an excessively acute angle is not preferred because the ridges become notched, and an obtuse angle is not preferred either because the magnetic films formed in subsequent steps will be shallower than the coil-winding groove when the core thickness must be made small. Therefore, the angle $\theta$ of the ridges is preferably between 10 to 15 degrees.

Figure 5C:
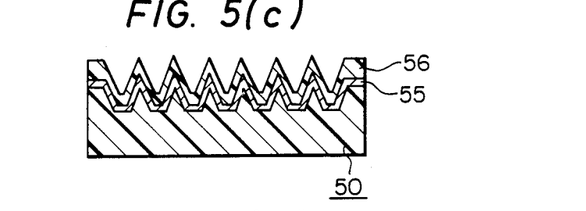

(iii) Step (c) is a step in which a metallic magnetic film 55 is sputtered and deposited over all the surfaces of the abutting surface of the gap, including the groove portion formed in the preceding step (b). The metallic magnetic material could be a crystalline alloy represented by a Fe—Al—Si (i.e., Sendust) or a Ni—Fe alloy (i.e., Permalloy), or an amorphous alloy such as a well-known metal metalloid alloy represented by a Co—Fe—Si—B alloy, or a well-known metal-metal alloy such as Co—Ti, Co—Mo—Zr, Co—Nb—Zr or Co—W—Zr. The deposition method may be replaced by vacuum evaporation, ion plating, chemical evaporation, or plating. However, these methods present problems in that they can only be used for limited kinds of metals, and that the composition thereof fluctuates widely, so that a sputtering method is the most suitable. Sputtering also has the advantage in that the adhesion strength provided is high, and that the metallic magnetic film can be extended around into the groove portions, and is thus suitable for the process of the present invention. The thickness of the deposited metallic magnetic material can be made smaller than the desired track width because depositions on both sides of the ridges can be reduced. In the present embodiment, the thickness of the magnetic film can be 15 $\mu$m to obtain a track width of 28 $\mu$m, for example. The magnetic film may be a multi-layered film in which non-magnetic substances are alternately deposited, if necessary.

It is preferable that, after the deposition of the metallic magnetic film, a non-magnetic material 56 such as $Al_2O_3$ or $SiO_2$ is deposited as a protective film. This protective film is effective for protecting the metallic magnetic film 55, and ensures the wear-resistance of the contacting portions in the vicinity of the gap when the head core is completed.

Figure 5D:
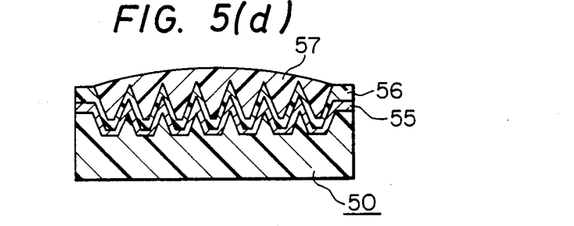

(iv) Step (d) is a step at which a non-magnetic material 57 is used to cover the metallic magnetic film and the protective film formed in step (c) to such an extent that at least the rest of each of the groove portions is filled up. The non-magnetic material 57 is either an inorganic adhesive of glass or ceramic, or a hard resin. Glass is suitable from a safety point of view. The working temperature of the glass can be selected to be within a wide range lower than 800° C. if the metallic magnetic film 55 is made of a crystalline alloy. For an amorphous alloy, on the other hand, the working temperature must be selected to be below the crystallization level at the most, and it is generally necessary to use a glass having a low melting point with a working temperature of less than 500° C.

Incidentally, step (d) may be omitted, and the grooves may be filled up with the non-magnetic film 56 in step (c). Or in step (d), the grooves may be filled with the glass 57 alone, omitting the non-magnetic film 56.

Figure 5E:
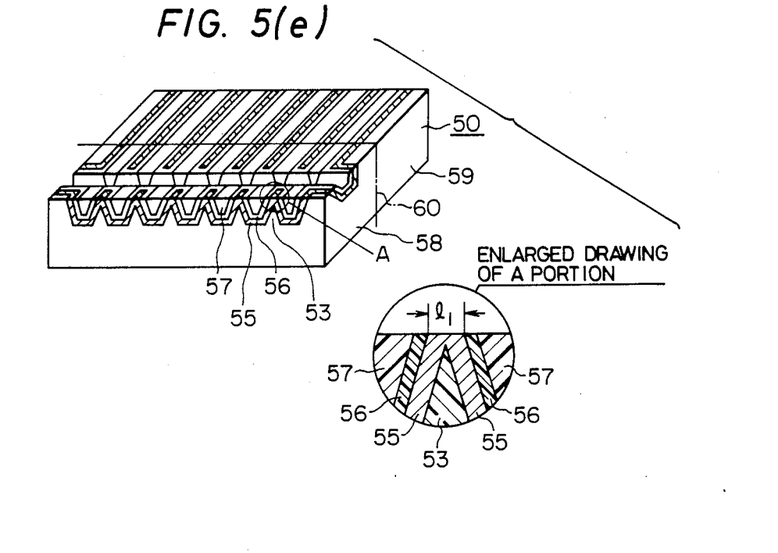

(v) Step (e) is a step in which two of the blocks obtained by step (d) are prepared, and one of them is worked. The unwanted portions of the non-magnetic materials 56 and 57 and the metallic magnetic film 55 of one of the blocks are removed to expose the surface forming the functional gap, which is made of the metallic magnetic film to the desired track width $l_1$. This block provides the head core for recording and reproduction. This removal is done by griding and polishing, and the surface is finally finished to a mirror surface to provide the abutting surfaces for the gap. FIG. A is an enlarged view of a portion obtained in step (e), and the mirror-polishing is continued until the track width $l_1$ is obtained. The block 50 is then cut along the broken center line 60 to provide a pair of core blocks 58 and 59. The core blocks 58 and 59 are abutted and connected to each other to provide an equal track width, after non-magnetic gap films are formed on corresponding abutting gap surfaces.

Figure 5F:
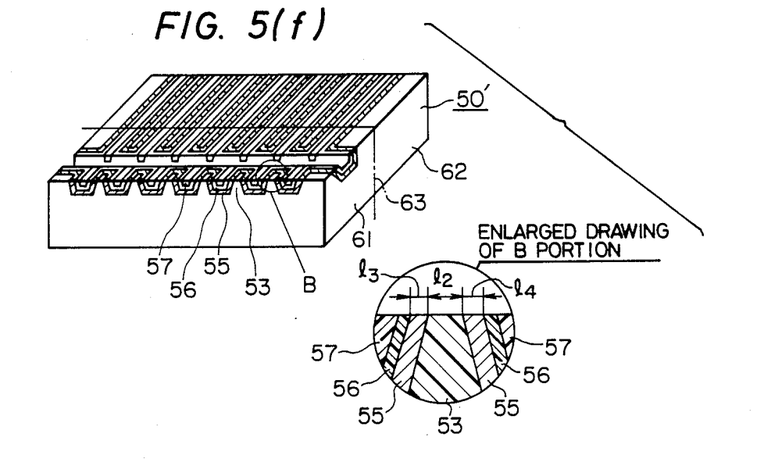

(vi) Step (f) is a step in which the other block prepared in step (d) is worked. The unwanted portions of the non-magnetic materials 56 and 57 and the metallic magnetic film 55 of this block 50' are removed until the ridges 53 made of the non-magnetic material are exposed. FIG. B is an enlarged view of a portion obtained in step (f). The width $l_2$ by which the ridges 53 are exposed corresponds to the recording track width, and is such that $l_1 \geq l_2$ for the track width $l_1$. The block thus worked has a structure such that metallic magnetic films 55 are separated on either side of the non-magnetic ridges 53. Thus, the two head cores can be formed on identical non-magnetic substrates. From this block, the head core for erasure is prepared. The track width of this head core is governed by the thickness of the metallic magnetic films, which are $l_3$ and $l_4$, respectively. The working method is similar to that of step (e) until the block 50' is finally cut along the broken center line 63 to provide a pair of core blocks 61 and 62. The core blocks 61 and 62 are abutted and connected to each other to provide an equal track width, after non-magnetic gap films are formed on the corresponding abutting gap surfaces.

Figure 5G:
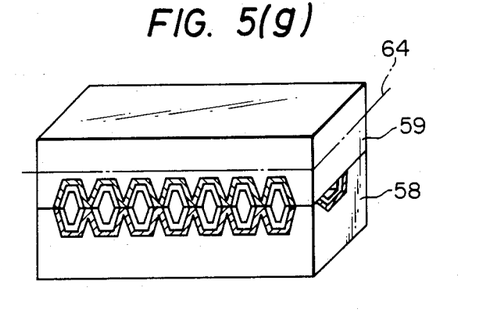

(vii) Step (g) is a step in which the core blocks 58, 59 prepared in step (e) are abutted and connected to each other under pressure and at an increased temperature. In this case, the connection is effected by a glass material if the non-magnetic material 57 filling the grooves is glass, or by a resin after forming notched grooves in a portion of the coil-winding apertures and in a rear connection portion, if a material with a high melting point such as $Al_2O_3$ is used. The side of the core block 59 without the coil-winding aperture is then cut along broken line 64 to provide a surface for the connection to the next block.

Figure 5H:
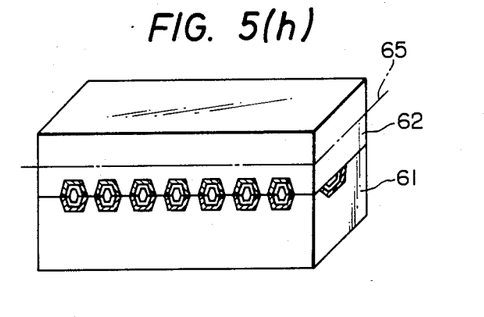

(viii) In step (h), the other core blocks 61 and 62 obtained in a step (f) are abutted and connected to each other under pressure and at an increased temperature in the same way as in step (g) until they are integrated. The side of the core block 62 without the coil-winding aperture is then cut along dashed line 65 to provide a surface for the connection to the preceding block.

Figure 5I:
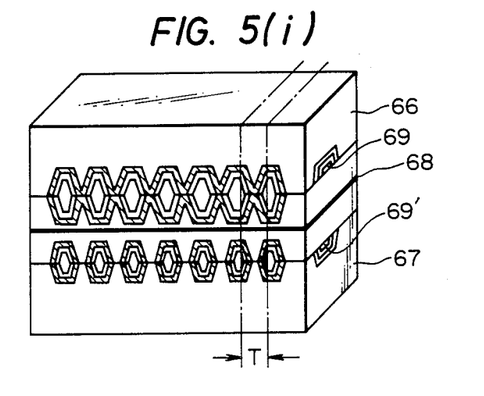

(ix) In step (i), the blocks 66 and 67 obtained in steps (g) and (h) are connected at a portion 68 to each other. This portion 68 can be connected with a high dimensional accuracy because it is formed of glass by sputtering and is compressed at an increased temperature. This connected structure is then cut to provide a desired core thickness T, as indicated by the broken lines, along the centers of the track widths to provide a plurality of integrated magnetic heads, each of which is constructed of a first head core for recording and playback and a pair of second-and-third head cores for erasure. Numerals 69 and 69' indicate each of coil-winding apertures.

Figure 6:
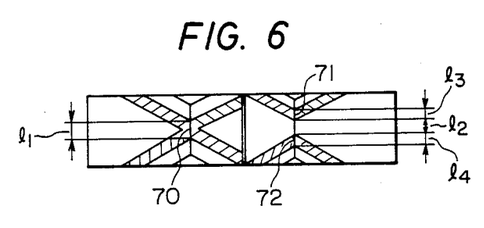
FIG. 6 is a top plan view of the surface of the magnetic head facing the recording medium, which is obtained by the magnetic head fabrication process of FIG. 5.

FIG. 6 shows the surface of the recording head facing the recording medium, which is obtained in step (i). A recording and playback gap 70 and a pair of erasure gaps 71 and 72 are arranged parallel to each other so that portions near the two side edges of the recording track $l_1$ formed by the recording and playback gap 70 are erased for width $l_3$ and $l_4$ by the pair of erasure gaps 71 and 72, leaving the effective recording track width $l_2$. In other words, the space $l_2$ between the two erasure gaps 71 and 72 is made equal to or slightly less than the width $l_1$ of the recording and reproduction gap 70.

Figure 7:
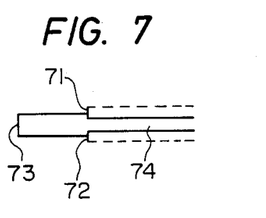
FIG. 7 is a schematic, illustrative view of the recording track formed by the magnetic head of the present invention.

With this structure shown in FIG. 7, the pair of erasure gaps 71 and 72 scan just the two side portions of a recording track 73 formed by the recording and playback gap 70. As a result, both sides of the recording track 73 contain no signal, to provide an effective recording track 74.

Figure 8:
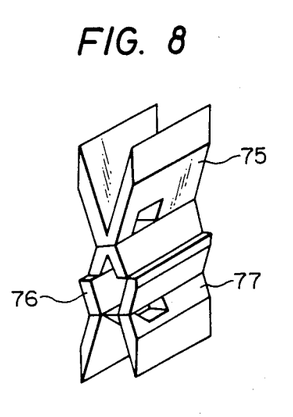
FIG. 8 is a perspective view of the magnetic core portions removed from the magnetic head of one embodiment of the present invention.

FIG. 8 is a perspective view of the magnetic portions removed from the magnetic head cores of the present invention. Numeral 75 indicates a first magnetic core portion for recording and reproduction, numerals 76 and 77 indicate second and third magnetic cores for erasure. The second and third magnetic cores are connected together at the portions thereof with the coil-winding apertures, but may be separated depending on the working method. The magnetic head of the present invention can be fabricated by winding a coil around on the magnetic head thus far described.

Figures 9A, 9B, 9C:
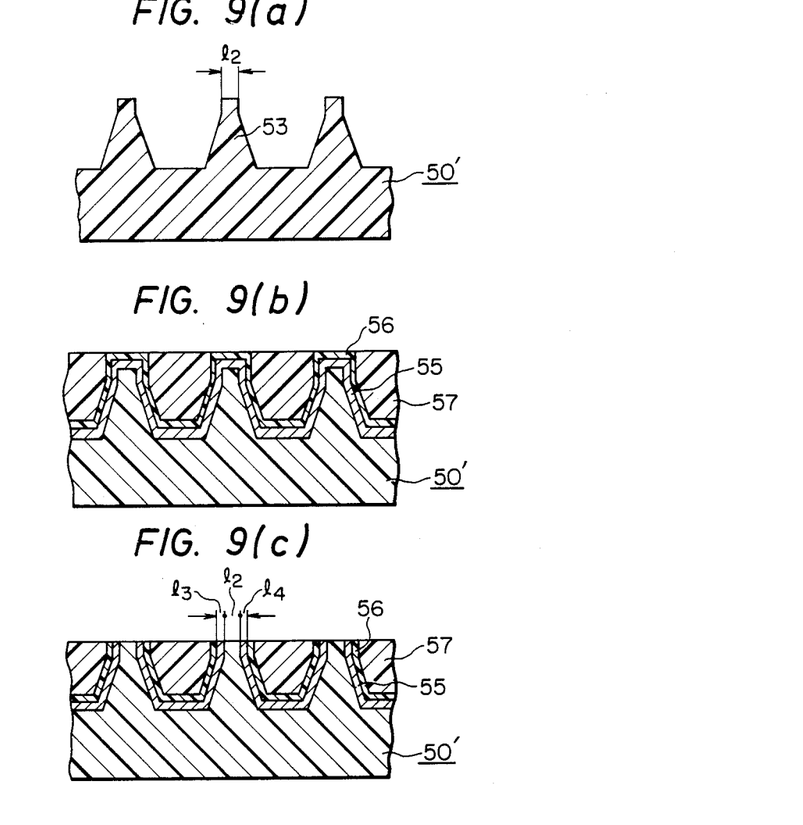
FIGS. 9(a) to (c) are sections of the individual steps of the process of fabricating the magnetic head according to another embodiment of the present invention.
Figure 10:
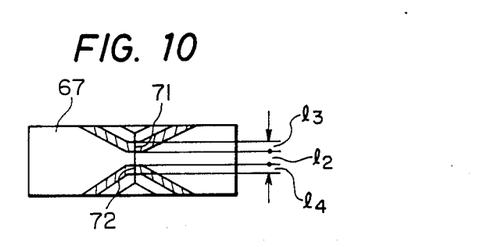
FIG. 10 is a top plan view of the surface of the magnetic head facing the recording medium, which is obtained by the process of FIG. 9.

Another embodiment of the present invention is shown in FIGS. 9 and 10, which concern the construction and fabrication process of the erasure head in particular. FIGS. 9(a) to (c) are top plan views of the surface of a magnetic core block half which will face the recording medium, during the steps of its fabrication. The main fabrication steps are similar to those of the embodiment of FIG. 5, but a specific difference therefrom resides in the shape of the ridges 53 formed in the non-magnetic block 50' in the step shown in FIG. 9(a). More specifically, grooves are formed in both sides of the ridges 53 such that the leading edges of the ridges 53 are left having the effective recording track width $l_2$. After that, in the step shown in FIG. 9(b), the metallic magnetic films 55 of a desired thicknesses are formed on at least both sides of the ridges, and the non-magnetic protective film 56 is formed, and the rest of each of the grooves is filled up with the glass 57.

Next, in the step shown in FIG. 9(c), when the unwanted portions of the non-magnetic materials 56 and 57 and the metallic film 55 have been removed, the leading edge portions of width $l_2$ of the ridges 53 are exposed so that the metallic magnetic films 55 are exposed at either side thereof to the widths $l_3$ and $l_4$. In other words, the width $l_2$ can be formed very precisely so that the recording track width $l_2$ can be obtained by erasing the side portions of the recording width $l_1$ produced by the recording and reproduction head core by the track widths $l_3$ and $l_4$ of the pair of erasure heads.

FIG. 10 is a top plan view of the surface of the erasure head core thus completed which faces the recording medium. The reference characters therein correspond to those of the previous head core.

In order that the structure of the head core made by using the steps shown in FIGS. 9(a) to (b) can be applied to a recording and reproduction head, it is preferable that the leading edge portions of the ridges 53 are shaped so that no portion thereof is parallel to the gap.

Although no coil is illustrated in any of the figures showing the magnetic head, it must be noted that such a coil is wound therearound.

Industrial Applicability

The magnetic head of the present invention can be applied to a magnetic recording and reproduction device of the type for recording a magnetic recording medium with a desired signal and forming the same with guard bands. The magnetic head is especially suitable for a magnetic recording and reproduction device for magnetic discs. Moreover, the fabrication process of the present invention can be used to easily fabricate the magnetic head of the present invention and is high in mass-productivity.

What is claimed is:

1. A magnetic head comprising: a recording reproduction head provided with a first core which has means for accommodating a first coil winding means and metallic magnetic films forming a magnetic circuit in response to the conduction of electric current through the first coil winding means and a recording and reproduction gap and formed on first non-magnetic members; an erasure head provided with second and third cores which have means for accommodating a second coil winding means and metallic magnetic films forming magnetic circuits in response to the conduction of electric current through the second coil winding means and respective, spaced erasure gaps and formed on side surfaces of ridges of second non-magnetic members so that the distance between the both metallic magnetic films on both side surfaces of the ridge of each of said second non-magnetic members becomes wider in proportion to the distance from the erasure gaps, and which are arranged to erase both side portions of a track width of a magnetically-recorded portion recorded on a magnetic recording medium by said recording and reproduction head, by the use of said second and third cores, to leave a predetermined recording track width; and means for connecting said recording and reproduction head and said erasure head in a direction in which said magnetic recording medium runs, wherein said erasure head is constructed such that pairs of metallic magnetic films forming magnetic circuits are formed on both side surfaces of two second non-magnetic members so that the leading edges of ridges of said second non-magnetic members are flat, and such that said pairs of metallic magnetic films are made to abut against each other through a non-magnetic gap material at portions thereof adjacent to the flat surfaces of the leading edges of said magnetic members to form said second and third cores, wherein said metallic magnetic films are exposed on the surface facing said magnetic recording medium, wherein the abutting portions of each of said pairs of metallic magnetic films extend parallel to each other and generally perpendicular to the direction in which said magnetic recording medium runs, and wherein the width of the flat surfaces of said leading edges of said second non-magnetic members sandwiched between said second and third cores is defined by the intersections between said flat surfaces and the surface facing said magnetic recording medium and is equal to or less than said track width.

2. The magnetic head as set forth in claim 1, wherein said recording and reproduction head is constructed such that ridges of a pair of metallic magnetic films of a generally V-shaped cross-sectional shape which form said magnetic circuit abut against each other either side of a non-magnetic gap material to form said first core, wherein V-shaped cross-sectional portion thereof are exposed on the surface of said first core facing said magnetic recording medium, wherein flat surfaces are provided on leading edges of said ridges of said pair of metallic magnetic films so as to extend parallel to each other and perpendicular to the direction in which said magnetic recording medium runs, wherein the width of said flat surfaces which is defined by the intersections between said flat surfaces and said surface facing said magnetic recording medium corresponds to said track width, and wherein said metallic magnetic films are formed on said non-magnetic member in which are formed ridges shaped to correspond to said V-shape.

3. The magnetic head as set forth in claim 2, wherein a non-magnetic protective material is formed on the surfaces of said metallic magnetic films of said recording and reproduction head.

4. The magnetic head as set forth in claim 1, wherein said metallic magnetic films of said recording and reproduction head and/or said erasure head are made of a highly permeable, polycrystalline alloy or a highly permeable, amorphous alloy.

* * * * *